(12) United States Patent
Mehrotra et al.

(10) Patent No.: US 6,934,252 B2
(45) Date of Patent: Aug. 23, 2005

(54) METHODS AND SYSTEMS FOR FAST BINARY NETWORK ADDRESS LOOKUPS USING PARENT NODE INFORMATION STORED IN ROUTING TABLE ENTRIES

(75) Inventors: Pronita Mehrotra, Raleigh, NC (US); Paul D. Franzon, Holly Springs, NC (US)

(73) Assignee: North Carolina State University, Raleigh, NC (US)

( * ) Notice: Subject to any disclaimer, the term of this patent is extended or adjusted under 35 U.S.C. 154(b) by 161 days.

(21) Appl. No.: 10/244,719

(22) Filed: Sep. 16, 2002

(65) Prior Publication Data

US 2004/0052251 A1 Mar. 18, 2004

(51) Int. Cl.[7] .................. H04L 12/56; H04L 12/44; G06F 12/00; G06F 17/30
(52) U.S. Cl. .................. 370/229; 370/389; 370/477; 707/6
(58) Field of Search ................... 370/229, 231, 370/235, 238, 351, 352, 389, 392, 412, 477; 707/3, 6, 7

(56) References Cited

U.S. PATENT DOCUMENTS

| | | | | | |
|---|---|---|---|---|---|
| 6,047,283 A | * | 4/2000 | Braun | .................. | 707/3 |
| 6,052,683 A | * | 4/2000 | Irwin | .................. | 707/8 |
| 6,067,574 A | * | 5/2000 | Tzeng | .................. | 709/247 |
| 6,266,706 B1 | * | 7/2001 | Brodnik et al. | .................. | 709/242 |
| 6,385,649 B1 | * | 5/2002 | Draves et al. | .................. | 709/224 |
| 6,434,115 B1 | * | 8/2002 | Schwartz et al. | .................. | 370/235 |
| 6,522,632 B1 | * | 2/2003 | Waters et al. | .................. | 370/254 |
| 6,539,369 B2 | * | 3/2003 | Brown | .................. | 707/1 |
| 6,614,789 B1 | * | 9/2003 | Yazdani et al. | .................. | 370/392 |
| 6,654,760 B2 | * | 11/2003 | Baskins et al. | .................. | 707/101 |
| 6,665,297 B1 | * | 12/2003 | Hariguchi et al. | .................. | 370/392 |
| 6,842,443 B2 | * | 1/2005 | Allen et al. | .................. | 370/335 |
| 2002/0107893 A1 | * | 8/2002 | Ohkouchi et al. | .................. | 707/514 |
| 2002/0118682 A1 | * | 8/2002 | Choe | .................. | 370/395.31 |
| 2002/0129086 A1 | * | 9/2002 | Garcia-Luna-Aceves et al. | .................. | 709/200 |
| 2002/0172203 A1 | * | 11/2002 | Ji et al. | .................. | 370/392 |
| 2003/0026246 A1 | * | 2/2003 | Huang et al. | .................. | 370/352 |
| 2003/0061227 A1 | * | 3/2003 | Baskins et al. | .................. | 707/101 |
| 2003/0081554 A1 | * | 5/2003 | Huang et al. | .................. | 370/238 |
| 2003/0091043 A1 | * | 5/2003 | Mehrotra et al. | .................. | 370/389 |
| 2003/0123459 A1 | * | 7/2003 | Liao | .................. | 370/401 |
| 2003/0174717 A1 | * | 9/2003 | Zabarski et al. | .................. | 370/401 |
| 2004/0008634 A1 | * | 1/2004 | Rangarajan et al. | .................. | 370/256 |
| 2004/0105422 A1 | * | 6/2004 | Sahni et al. | .................. | 370/351 |

OTHER PUBLICATIONS

International Preliminary Examination Report for PCT Application No. 03/29279 (Aug. 16, 2004).

O'Dell, "Internet Host and Traffic Growth," http://www.c-s.columbia.edu/hgs/internet/growth.html, p. 1–5, (Jun. 2001).

Chiueh et al., "Cache Memory Design for Network Processors," Proceedings of Sixth International Symposium on High–Performance Computer Architecture, p. 409–418, (2000).

(Continued)

Primary Examiner—John Pezzlo
Assistant Examiner—Ahmed Elallam
(74) Attorney, Agent, or Firm—Jenkins, Wilson & Taylor, P.A.

(57) ABSTRACT

Methods and systems for using binary searches for variable length network address prefix lookups are disclosed. Variable length prefixes are stored in a network address forwarding table. Each prefix corresponds to an entry in the forwarding table. The entries correspond to nodes in a binary tree. Each entry in the forwarding table includes path information regarding parent nodes of each entry in the binary tree. When a lookup is performed in the routing table, bits in the path information are used to determine the longest parent node prefix that matches the address being searched. The longest parent node prefix corresponds to the longest matching prefix.

40 Claims, 6 Drawing Sheets

OTHER PUBLICATIONS

Yazdani et al., "Fast and Scalable Schemes for the IP Address Lookup Problem," Proceedings IEEE Conference on High Performance Switching and Routing, p. 83–92, (2000).

McKeown et al., "High Performance Switches and Routers: Theory and Practice," Hot Interconnects Tutorial Slides (http://tiny–tera.stanford.edu/nickm/talks/index.html), p. 1–126, (Aug. 20, 1999).

Huang et al., "A Novel IP–Routing Lookup Scheme and Hardware Architecture for Multigigabit Switching Routers," IEEE Journal on Selected Areas in Communications, p. 1093–1104, (Jun. 1999).

Nilsson et al., "IP–Address Lookup Using LC–Tries," IEEE Journal on Selected Areas in Communications, p. 1083–1092, (Jun. 1999).

Chiueh et al., "High–Performance IP Routing Table Lookup Using CPU Caching," Proceedings IEEE INFOCOM'99, p. 1421–1428, (1999).

Gupta et al., "Routing Lookups in Hardware at Memory Access Speeds," Proceedings IEEE INFOCOM'98, p. 1240–1247, (1998).

Lampson et al., "IP Lookups Using Multiway and Multicolumn Search," Proceedings IEEE INFOCOM'98, p. 1248–1256, (1998).

Degermark et al., "Small Forwarding Tables for Fast Routing Lookups," Proceedings ACM SIGCOMM, p. 3–14, (Oct. 1997).

Waldvogel et al., "Scalable High Speed IP Routing Lookups," Proceedings ACM SIGCOMM, p. 25–36, (Oct. 1997).

Gray, "Internet Growth Summary," http://www.mit.edu/people/mkgray/net/internet–growth–summary.html, p. 1–2, (1996).

Sklower, "A Tree–Based Packet Routing Table for Berkeley Unix," Technical Report, EECS Department, Computer Science Division, p. 1–14, (1990).

* cited by examiner

METHODS AND SYSTEMS FOR FAST BINARY NETWORK ADDRESS LOOKUPS USING PARENT NODE INFORMATION STORED IN ROUTING TABLE ENTRIES

GRANT INFORMATION

This work was supported by grant number 10093.002 from the National Security Agency (NSA). Thus, the United States Government has certain rights in the invention.

TECHNICAL FIELD

The present invention relates to methods and systems for fast binary network address lookups. More particularly, the present invention relates to methods and systems for fast binary network address lookups using parent node information stored in routing table entries.

RELATED ART

Traffic on the Internet doubles every few months. Additionally, the number of hosts on the Internet has been increasing steadily, forcing a transition from the 32-bit addressing scheme of IPv4 to the 128-bit addressing scheme of IPv6. With bandwidth-intensive applications like video conferencing becoming increasingly popular, the demand on the performance of routers has increased. The most time consuming part in the design of a router is the route lookup.

When an IP router receives a packet on one of its input ports, the router must determine the output port for the packet depending on the destination address of the packet. To make this decision, IP routers typically search a large database of destination networks and hosts. This database is referred to as a routing table or a forwarding table. Routing tables store only address prefixes, which represent a group of addresses that can be reached from the output port. Due to subnetting and supernetting, IP routing tables contain variable-length prefixes. The problem of determining the destination network is equivalent to finding the longest matching prefix.

Most of the conventional approaches used to solve the longest matching prefix problem fall under either the "thumb indexing" approach or binary search approaches. The former approach does not scale well with large address sizes (as in IPv6). Binary schemes on the other hand use searches on either the number of routing entries or the number of possible prefix lengths. These schemes scale better with the greater address size of IPv6. However, conventional binary and other search schemes have performance problems, examples of which are discussed below.

Gupta et al., in P. Gupta, S. Lin, and N. McKeown, "Routing Lookups in Hardware at Memory Access Speeds," *Proc IEEE INFOCOM '98*, (San Francisco, Calif.), pp. 1382–1391, 1998, present a hardware implementation based on an indirect lookup scheme where the number of memory lookups required to determine the output port is small (1–2). Degermark et al., in M. Degermark, A. Brodnik, S. Carlsson, and S. Pink, "Small Forwarding Tables for Fast Routing Lookups," *Proc. ACM SIGCOMM*, vol. 27, pp. 3–14, October 1997, use compression techniques that allow a forwarding table to fit in on-chip caches. The hardware implementation by Huang et al., in N. Huang and S. Zhao, "A Novel IP-Routing Lookup Scheme and Hardware Architecture for Multigigabit Switching Routers," IEEE *Journal on Selected Areas in Communications*, vol. 17, pp. 1093–1104, June 1999, compacts a large forwarding table of 40,000 entries into 450–470 kb. Still other schemes, such as those described in T. Chiueh and P. Pradhan, "High-Performance IP Routing Table Lookup Using CPU Caching," *Proc. IEEE INFOCOM '99*, pp. 1421–1428, 1999 and T. Chiueh and P. Pradhan, "Cache Memory Design for Network Processors," *Proceedings of Sixth International Symposium on High-Performance Computer Architecture*, 2000, vol. HPCA-6, pp. 409–418, 2000, use caching to improve the performance of routing lookup. Caching relies on the temporal locality of data and this may not be very useful for core routers, which exhibit very little temporal locality.

Binary tries use less memory to store the forwarding databases than other routing data structures; however, the number of memory accesses required to determine the next address in the chain of routers between the current node and the destination, referred to as the next hop address, is much higher. The NetBSD implementation described in K. Sklower, "A Tree-Based Routing Table for Berkeley Unix," *Technical Report*, (University of California, Berkeley), uses a Patricia Trie, where a count of bits skipped is maintained for one-way branches. This reduces the average depth of the trie to some extent. The average length of the search in the Patricia implementation is 1.44 log(N), where N is the number of entries in the routing table. For large databases (>30,000), 22–23 memory accesses are still required. As described in S. Nilsson and G. Karlsson, "IP-Address Lookup Using LC-Tries," *IEEE Journal on Selected Areas in Communications*, vol. 17, pp. 1083–1092, June 1999, level compression (LC) can be used to further reduce the average depth of the trie.

Other approaches are variations of the binary search. A binary search by itself can work only with numbers, because binary searches involve comparing the numeric value of a destination network address extracted from a received packet to the numeric values of prefixes in a routing table. Prefixes in the routing tables represent ranges of numbers. As a result, a straight implementation of a binary search does not work. Modifications to the binary search have been proposed to adapt binary searches to routing tables with variable-length prefixes. The first of these modifications is the scheme proposed by Lampson et al., in B. Lampson, V. Srinivasan, and G. Varghese, "IP Lookups using Multiway and Multicolumn Search," *Proc. IEEE INFOCOM '98*, vol. 3, (San Francisco, Calif.), pp. 1248–1256, 1998, where each prefix is expanded into two entries. The set of these entries is then processed to compute pointers to help in the search process. Yazdani et al., in N. Yazdani and P. S. Min, "Fast and Scalable Schemes for the IP Address Lookup Problem," *Proc. IEEE Conference on High Performance Switching and Routing*, pp. 83–92, 2000, define a sorting scheme to sort prefixes of different lengths and then apply a binary search to the sorted list. However, their scheme leads to an unbalanced tree and a variable number of memory accesses. Waldvogel at al., in M. Waldvogel, G. Varghese, J. Turner, and B. Plattner, "Scalable High Speed IP Routing Lookups," *Proc. ACM SIGCOMM*, vol. 27, pp. 25–36, October 1997, disclose a hash-based scheme where a binary search is performed on the number of possible prefix lengths. This scheme scales well with the size of the routing table and at most five hash lookups (for IPv4) are required to determine the next hop address. However, as pointed out in Lampson et al. (B. Lampson, V. Srinivasan, and G. Varghese, "IP Lookups using Multiway and Multicolumn Search," *Proc. IEEE INFOCOM '98*, vol. 3, (San Francisco, Calif.), pp. 1248–1256, 1998), this scheme would not scale well with longer addresses as in IPv6.

In light of these difficulties associated with conventional binary network address search schemes, there exists a long felt need for improved methods and systems for network address lookups that minimize search time without unduly increasing table size.

DISCLOSURE OF THE INVENTION

The present invention includes improved methods and systems for binary network address lookups using a routing table with path or parent node information stored in each routing table entry. According to one aspect, the invention includes a new data structure for a network address routing table. The routing table includes entries corresponding to variable length network address prefixes. Each entry is indexed by its corresponding prefix. The entries correspond to nodes in a binary tree. According to the invention, at each entry or node in the routing table, path information is stored. The path information includes a binary bit string indicating bits in the prefix for the entry that correspond to parent nodes of the current entry in the binary tree. Each entry also stores forwarding address information corresponding to each parent node and a value indicative of the number of parent nodes for the current entry. In one variation, the data structure includes an entry corresponding to each node in the routing table. In another variation, the data structure includes entries for leaf nodes only.

When performing a binary search in a table with variable length network addresses, the search usually results in two entries between which the value being searched falls. In one exemplary implementation, the routing table may be arranged in ascending order by network address prefixes. When a binary lookup is performed in a routing table arranged in ascending order, the path information in the lower entry, i.e., the next entry in the table having a value greater than the value being searched, is used to determine the longest matching prefix corresponding to the value being searched. More particularly, the bits in path information are analyzed. These bits indicate bits in the prefix that correspond to parent nodes of the prefix. The parent node prefix with the most bits that match the value being searched is the longest matching prefix. Destination information can then be extracted from the entry using the longest matching prefix. Thus, by storing path information in each entry, the present invention reduces the number of steps required to perform binary searches in routing tables with variable-length prefixes.

Accordingly, it is an object of the invention to provide improved methods and systems for fast binary network address lookups that reduce the number of accesses to a routing or forwarding table.

It is another object of the invention to provide improved methods and systems for fast binary network address lookups that reduce routing or forwarding table size.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

In order to explain details of the invention, it is necessary to illustrate an exemplary binary tree constructed based on routing table entries according to the invention. Table 1 shown below illustrates an exemplary routing table.

TABLE 1

Routing Table with Prefixes and Destination Network Addresses

| Prefix | Next Hop |
|---|---|
| 10* | 3 |
| 1011* | 9 |
| 011* | 8 |
| 010110* | 5 |
| 001* | 4 |
| 101101* | 2 |
| 011010* | 6 |
| 011100* | 1 |
| 10111* | 8 |
| 00101* | 7 |

In Table 1, each entry in the left hand column corresponds to a variable length network address prefix, with "*" corresponding to a wild card. The right hand column in Table 1 corresponds to the next hop address. Table 2 shown below illustrates Table 1 after sorting the prefixes in ascending order according to their numeric values.

TABLE 2

Prefixes from Table 1 After Sorting

| Prefix | Next Hop |
|---|---|
| 00101* | 7 |
| 001* | 4 |
| 010110* | 5 |
| 011010* | 6 |
| 011100* | 1 |
| 011* | 8 |
| 101101* | 2 |
| 10111* | 8 |
| 1011* | 9 |
| 10* | 3 |

Figure 1:
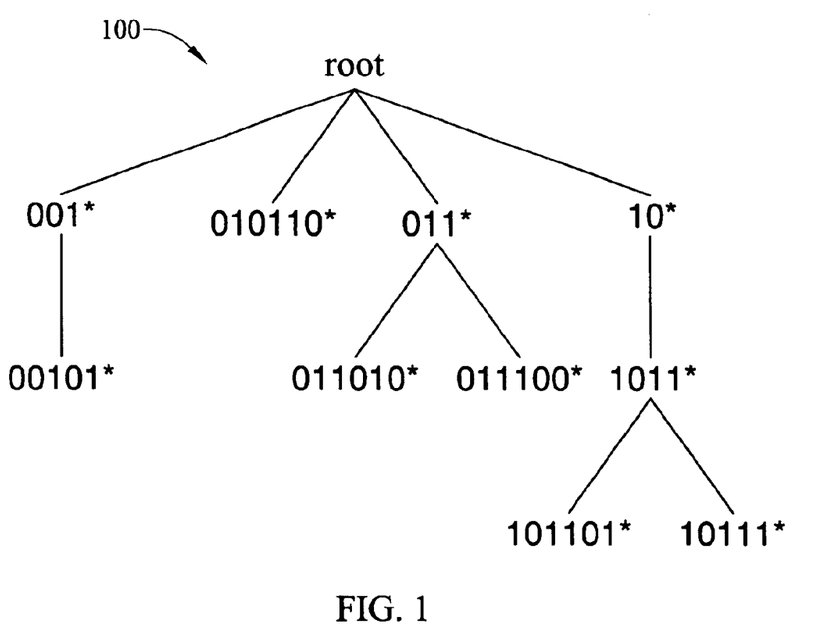
FIG. 1 is a data structure diagram illustrating relationships between variable length prefixes when arranged in a binary tree according to one example of the present invention.

As stated above, the present invention includes storing path information indicating the parent nodes of each prefix in routing table entries. In order to illustrate the relationship between prefixes in a routing table and parent nodes, a binary tree can be constructed using the prefixes in the routing table. FIG. 1 illustrates an exemplary binary tree constructed using the routing table entries in Table 1. In FIG. 1, each node in binary tree 100 corresponds to an entry in Table 1.

To place prefixes in their relative positions in tree 100, two conditions were used. Using the notation in N. Yazdani and P. S. Min, "Fast and Scalable Schemes for the IP Address Lookup Problem," *Proc. IEEE Conference on High Performance Switching and Routing*, pp. 83–92, 2000, for two prefixes, $A=a_1a_2 \ldots a_m$ and $B=b_1b_2 \ldots b_n$, 1) If $A \subset B$, the A is a parent of B (where the parent may be any node along the path from the node to the root of the tree)
2) If $A \not\subset B$ and $A<B$, then A lies on a subtree to the left of B. To compare A and B, if the prefix lengths of A and B are equal, i.e. n=m, then the prefixes can be compared by taking their numerical values. However, if n≠m, then the longer prefix is truncated to the length of the shorter prefix and the numerical values compared. By applying these conditions to all the prefixes, tree 100 in FIG. 1 can be constructed. To illustrate the concept of a parent node, in FIG. 1, the entry 101101* has three parent nodes: 1011*, 10*, and the root node. Similarly, the prefix 011100* has two parent nodes: 011* and the root node. As will be described in more detail below, storing path information regarding the parent nodes of each prefix reduces the number of steps required to be performed in network address lookups. In addition, the path information can be used to reduce the number of entries in the routing table.

The problem with performing a binary search on variable length prefixes can now be seen. By simply sorting the prefixes in some fashion and performing a binary search, it would not be possible to determine the longest matching prefixes. For instance, the prefixes could be sorted using the rules given above as shown in Table 2. This is equivalent to having performed a post-order depth-first-search on the binary tree in FIG. 1. Performing a simple binary search for a given address on the sorted prefixes would not necessarily lead to the longest matching prefix. For instance, prefixes 101100* and 100* both lie between the entries 011* and 101101*, but the prefixes have different longest matching prefixes. In general, the prefix could be any of the parent nodes or the root (default) node. Therefore, to determine the correct next hop, additional (and a variable number of) steps would need to be performed. This problem arose because the node 101101* did not carry any additional information about its parent nodes.

This problem can be avoided by storing an additional field at each node that gives information about all the parent nodes of each node. This additional field, referred to herein as the path information field, may be a 32-bit entry (for IPv4) where a 1 in any bit position in the field means that there is a parent node with a prefix corresponding to all bits in the prefix of the current node up until that bit position. For example, for the leaf node of 101101* the path information field may be 0 . . . 101010, i.e. the second bit from the right (corresponding to a parent node prefix of 10*), the fourth bit from the right (corresponding to a parent node prefix of 1011*) and the sixth bit from the right (corresponding to the prefix of the leaf node itself) are set to 1.

In addition to information about parent node prefixes, each node preferably also contains a pointer to a list of next hop addresses for the corresponding bits in the path information field. In this case, the list of next hop addresses would be 2, 9, and 3. By examining the path information field, the longest matching prefix can be determined and the correct next hop address can be obtained from the list.

Figure 2:
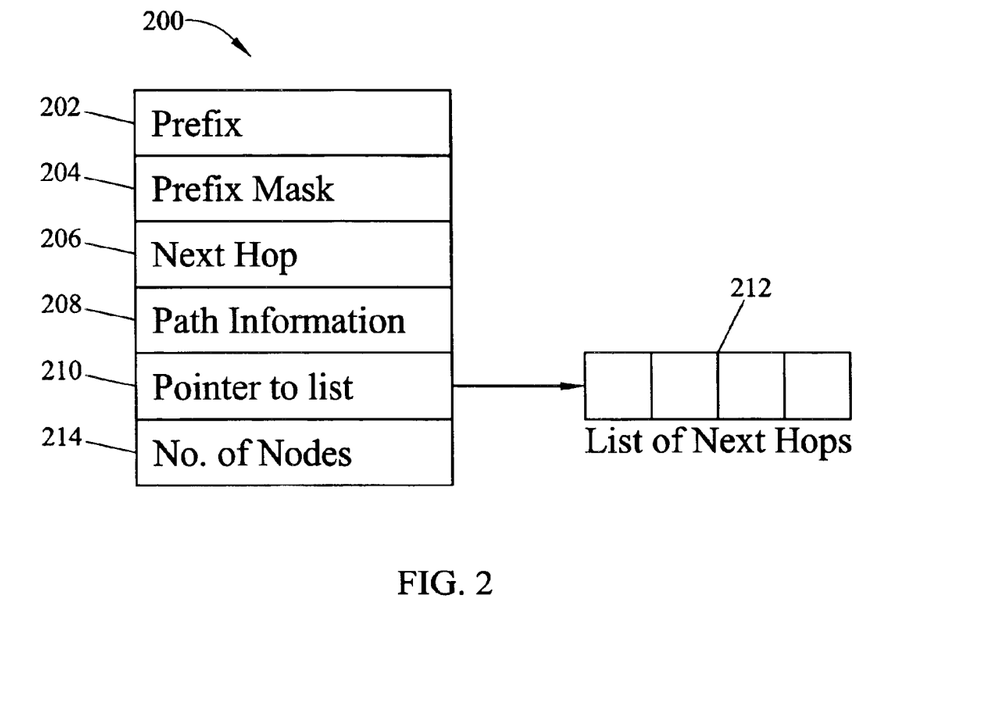
FIG. 2 is a block diagram illustrating an exemplary routing table entry data structure according to an embodiment of the present invention.

FIG. 2 illustrates an exemplary node data structure according to an embodiment of the present invention. In FIG. 2, node data structure 200 includes a prefix field 202, a prefix mask field 204, a next hop address field 206, a path information field 208, a destination address list pointer field 210, a destination network address list field 212, and a number of nodes field 214. Prefix field 202 stores the prefix corresponding to each node in the routing table. Prefix mask field 204 stores a bit mask to be applied to a destination address in a received packet before being compared to the prefix stored in prefix field 202. Next hop address field 206 stores the next hop address and/or output port identifier corresponding to the prefix stored in prefix field 202. Path information field 208 stores path information that indicates bits of the prefix in prefix field 202 that correspond to parent nodes. Pointer field 210 stores a pointer to list field 212. List field 212 stores a list of next hop network addresses and/or output port information for parent nodes indicated by the path information stored in path information field 208. Number of nodes field 214 stores a value indicating the number of internal nodes in the path from the root to the current node. Table 3 shows exemplary information that may be stored with each of the entries in Table 2.

TABLE 3

Routing Table with Path Information Stored in Each Entry

| Prefix | Next Hop | Path Information | Next Hop List |
| --- | --- | --- | --- |
| 00101* | 7 | 0 . . . 010100 | 4 |
| 001* | 4 | 0 . . . 000100 | — |
| 010110* | 5 | 0 . . . 100000 | — |
| 011010* | 6 | 0 . . . 100100 | 8 |
| 011100* | 1 | 0 . . . 100100 | 8 |
| 011* | 8 | 0 . . . 000100 | — |
| 101101* | 2 | 0 . . . 101010 | 9,3 |
| 10111* | 8 | 0 . . . 011010 | 9,3 |
| 1011* | 9 | 0 . . . 001010 | 3 |
| 10* | 3 | 0 . . . 000010 | — |

Using the same example described above, if the address 101100* were to be searched for in the list, the search would point to between the upper and lower entries of 011* and 101101*, respectively. A comparison between the address 101100* and the lower entry 101101* results in a match of up to 5 bits. By examining the path information field, bit 5 is not set to 1. The next lower bit that is set is bit 4. Therefore, the longest matching prefix for the given address is the first 4 bits of the prefix for the current entry or 1011* and the corresponding next hop address in the next hop list is 9. In this case, the address needs to be compared with only the lower entry resulting from the search failure. To illustrate why this is true, the following binary search result cases can be considered:

1) The current address falls between two leaf nodes with a common parent node. In this case either of the nodes can be used to determine the next hop address.
2) The current address falls between a node and its parent node. In this case, the parent node is the longest matching prefix and the parent node is the lower (larger) entry.
3) The current address falls between a node connected to the root node and a leaf node of the next branch (as in 011* and 101101*). In this case, nothing is gained by comparing the current address with the smaller entry, since this comparison can only lead to the root node (default next hop).

Thus, in all possible cases, it suffices to compare the address against only the lower entry to look for partial matches. However, the present invention is not limited to comparing the address to only the lower entry. The upper or higher entry can be used in addition to the lower entry without departing from the scope of the invention.

Building the Data Structure

Figure 3:
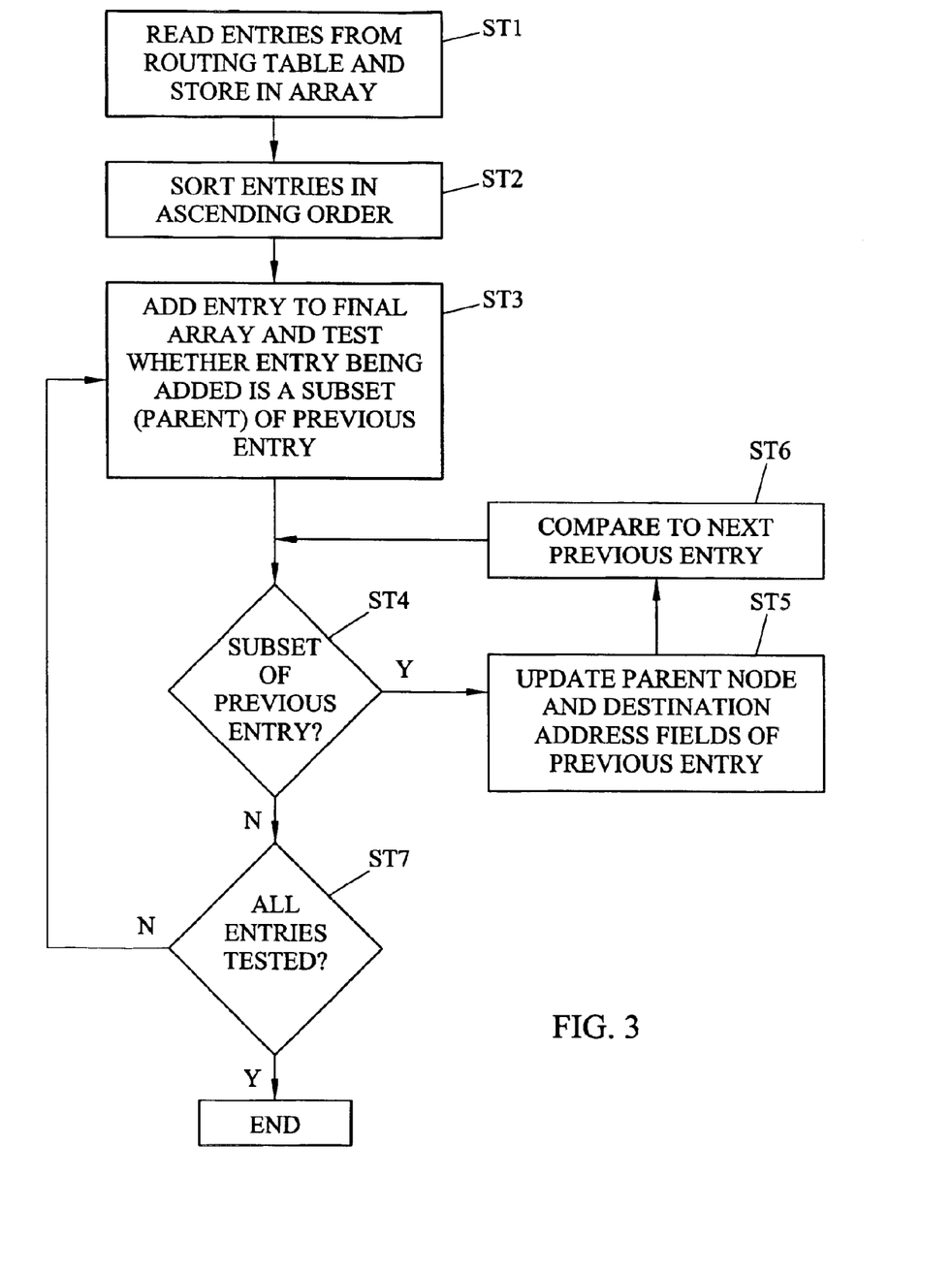
FIG. 3 is a flow chart illustrating exemplary steps that may be performed in creating a routing table according to an embodiment of the present invention.

FIG. 3 illustrates exemplary steps for building a routing table data structure and for generating and storing path information in the routing table data structure according to an embodiment of the present invention. Referring to FIG. 3, the following steps may be performed:

Step ST1: Each entry is read from the routing table and stored in an array.

Step ST2: The entries are then sorted in ascending order. To compare prefixes, the rules listed above may be used. For prefixes of unequal lengths, if after truncating the longer prefix, the prefixes are equal in value, then the shorter prefix is considered to be the larger of the two. This ensures that in the following steps, the child nodes get processed before the parent nodes.

Steps ST3 and ST4: Entries from the sorted list are then processed and added in an array, one at a time. Each entry is also tested with the last array entry to see if it is a subset of the previous array entry.

Steps ST5–ST7: If the current entry is a subset, then the destination address information corresponding to the current array entry is added to the next hop list of the previous array entry. The path information field of the previous array entry is updated along with the field containing the number of nodes. Steps ST4–ST6 are repeated for all previous entries in the array until the test for subsets fails. To illustrate why the subset test should be repeated for each entry, the last prefix in Table 3 can be considered. When prefix 10* is compared with the last array entry (1011*), it is added in the next hop list of 1011*. However, 10* also lies in the path of 10111* and 101101*, and the corresponding entries need to be updated as well. In step ST7, it is determined whether the current entry being tested is the last entry in the routing table. If the current entry is the last entry, the routing table generation process ends. If the current entry being tested is not the last entry in the table, steps ST4–ST7 are repeated for each remaining entry until the node data structures for each entry are complete.

Searching the Data Structure

Figure 4:
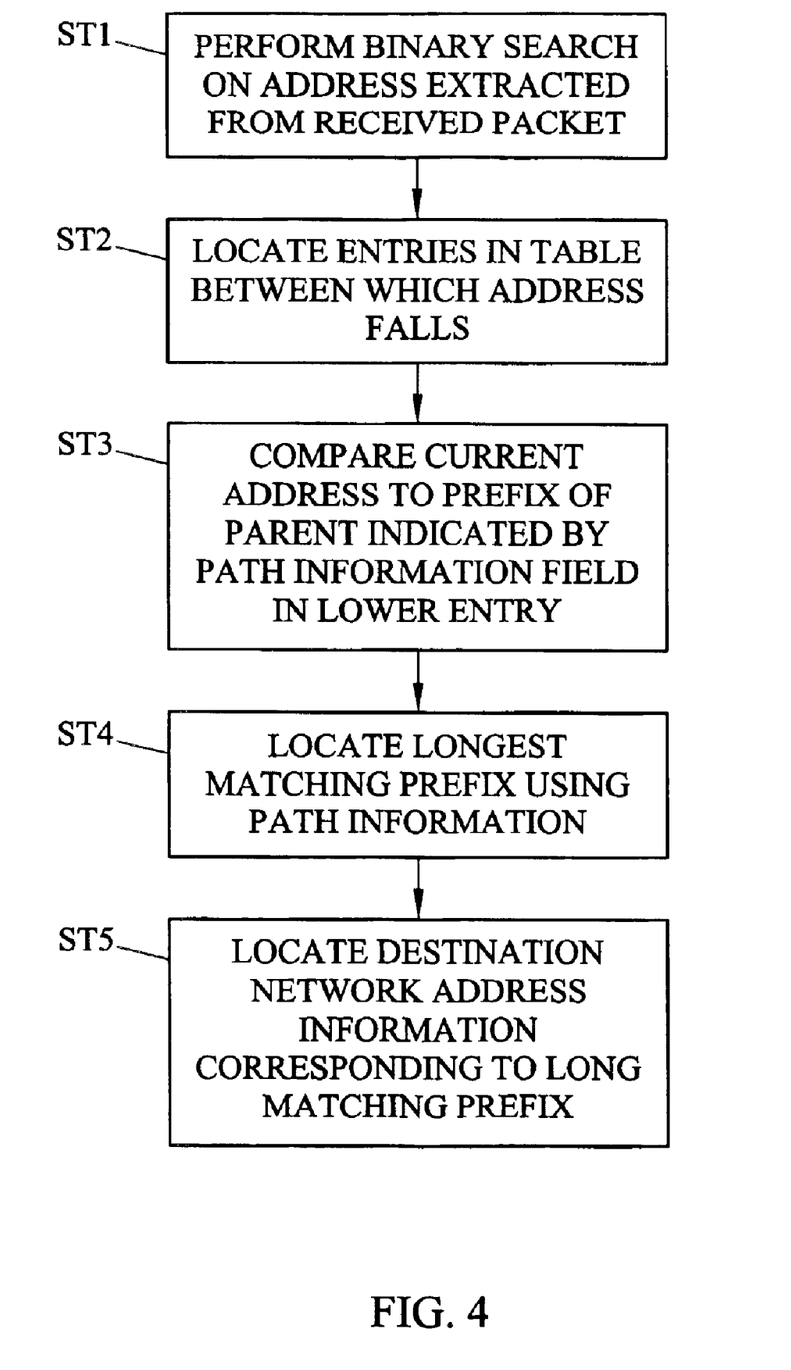
FIG. 4 is a flow chart illustrating exemplary steps for searching a routing table where path information is stored in each entry according to an embodiment of the present invention.

FIG. 4 illustrates exemplary steps for searching a data structure for a destination network address using nodes having stored path information according to an embodiment of the present invention. As will be described in more detail below, the steps illustrated in FIG. 4 may be performed in a network address forwarding engine, such as an IP forwarding engine, to determine next hop addresses and/or output ports associated with IP addresses. Referring to FIG. 4, in step ST1, a binary search is performed on an address extracted from a received packet. The binary search is performed in a routing table, such as that illustrated in Table 3 above. Performing a binary search typically involves comparing the numeric value of the destination network address in the received packet to entries in the routing table. A bit mask may be applied to the prefix prior to the comparison. In step ST2, entries between which the current address falls are located. In step ST3, the path information field in the lower entry is examined. As used herein, the term "lower entry" refers to the next entry in the routing table that is greater than the current address being searched. The path information field is used to determine information regarding parent nodes of the current entry. Specific examples of how this step may be performed are set forth above. In step ST4, the longest matching prefix is determined using the path information. The longest matching prefix is the longest parent node prefix that matches the current address being searched. In step ST5, the destination address corresponding to the longest matching prefix, is located. As illustrated in FIG. 2, each entry in the routing table may store a list of next hop addresses and/or output port identifiers corresponding to each prefix indicated by the path information. Because information regarding parent nodes is stored along with each node in a network routing table according to the present invention, the time required to locate a destination or next hop network address is reduced.

Figure 5:
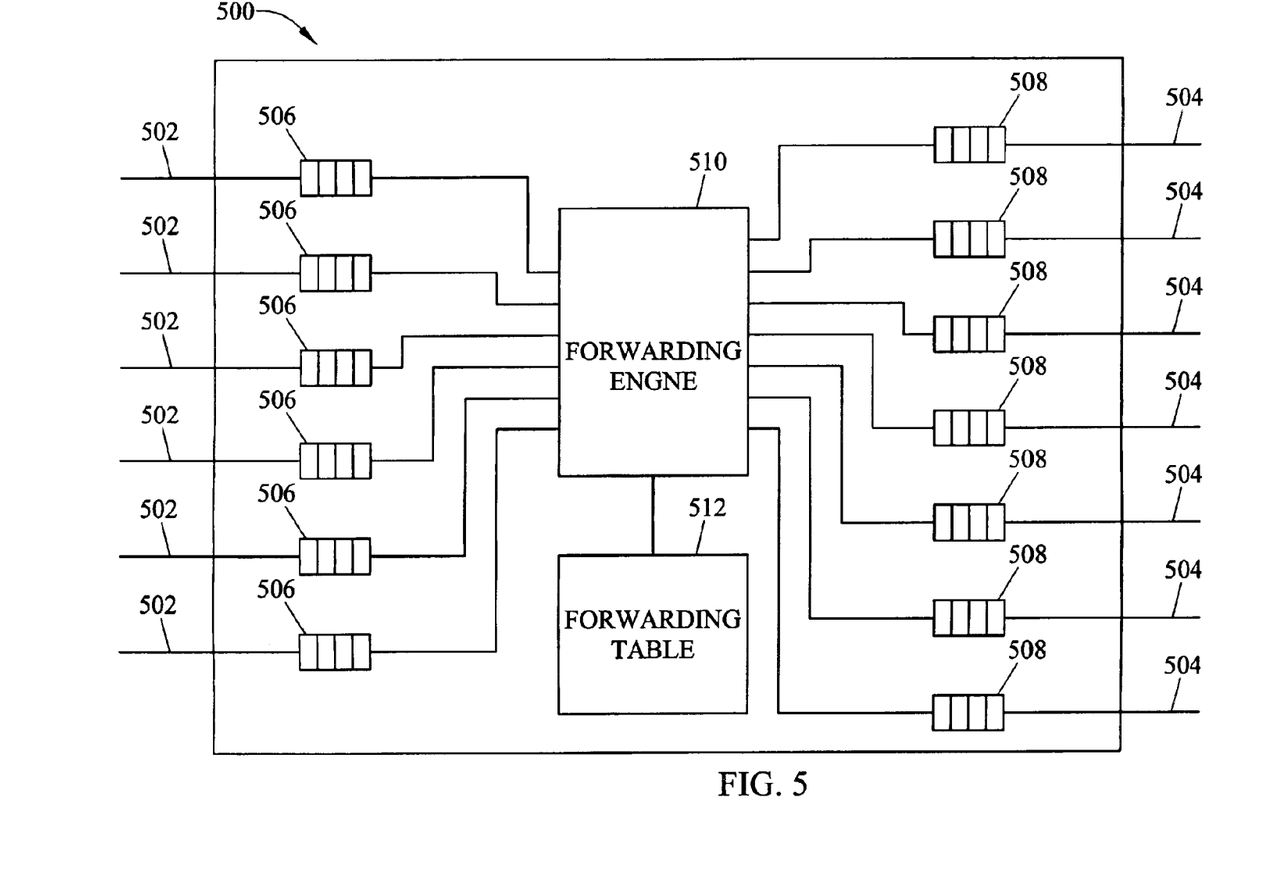
FIG. 5 is a block diagram of a forwarding device in which the methods and systems of the present invention may be implemented.

FIG. 5 illustrates an exemplary architecture for a network packet forwarding device in which the methods and systems of the present invention may be implemented. In FIG. 5, forwarding device 500 includes a plurality of input ports 502 and a plurality of output ports 504. Input ports 502 may receive packets from an external network, such as an IP network. Similarly, output ports 504 may forward packets to external networks. Input ports 502 and output ports 504 may include input buffers 506 and output buffers 508, respectively, depending on the design of forwarding device 500. A forwarding engine 510 determines the output port to which a received packet should be forwarded based on the destination address in the packet and information stored in forwarding table 512. For example, forwarding engine 510 may implement the steps illustrated above in FIG. 4 for locating a destination network address using path information stored in forwarding table entries. Similarly, forwarding table 512 may store a table in which each node includes path information regarding its parent nodes as described above with regard to Table 3 and constructed according to the steps illustrated in FIG. 3. Forwarding engine 510 and forwarding table 512 may be implemented in hardware, software, or a combination of hardware and software.

Updating the Data Structure

Inserting or deleting entries from a network address forwarding table is equivalent to adding or deleting an entry from an array. To add an entry, a binary search is performed as outlined in the previous section, to find the location of the insertion. The entry is then added into the array, which is an O(N) process. The entry is also checked against entries above it to see if it is a subset or not, and the corresponding path information field and next hop list is updated. Deleting an entry follows a similar procedure. Updating the data structure, therefore, does not require the entire data structure to be built from scratch.

Using Disjoint Prefixes for Binary Search

The search space used in the previous scheme can be reduced further by using only mutually disjoint prefixes. Two prefixes are considered disjoint if neither is a prefix of the other. Disjoint prefixes correspond to the leaf nodes of the tree shown in FIG. 1. All internal nodes can be removed from the search space since the information corresponding to the internal nodes is already contained in the path information field and the next hop list of the leaf nodes. The search space can then be shortened as shown in Table 4.

TABLE 4

Search Space Containing Leaf Nodes Only

| Prefix  | Next Hop | Path Information | Next Hop List |
|---------|----------|------------------|---------------|
| 00101*  | 7        | 0 . . . 010100   | 4             |
| 010110* | 5        | 0 . . . 100000   | —             |
| 011010* | 6        | 0 . . . 100100   | 8             |

TABLE 4-continued

Search Space Containing Leaf Nodes Only

| Prefix | Next Hop | Path Information | Next Hop List |
|---|---|---|---|
| 011100* | 1 | 0 . . . 100100 | 8 |
| 101101* | 2 | 0 . . . 101010 | 9.3 |
| 10111* | 8 | 0 . . . 011010 | 9.3 |

Figure 6:
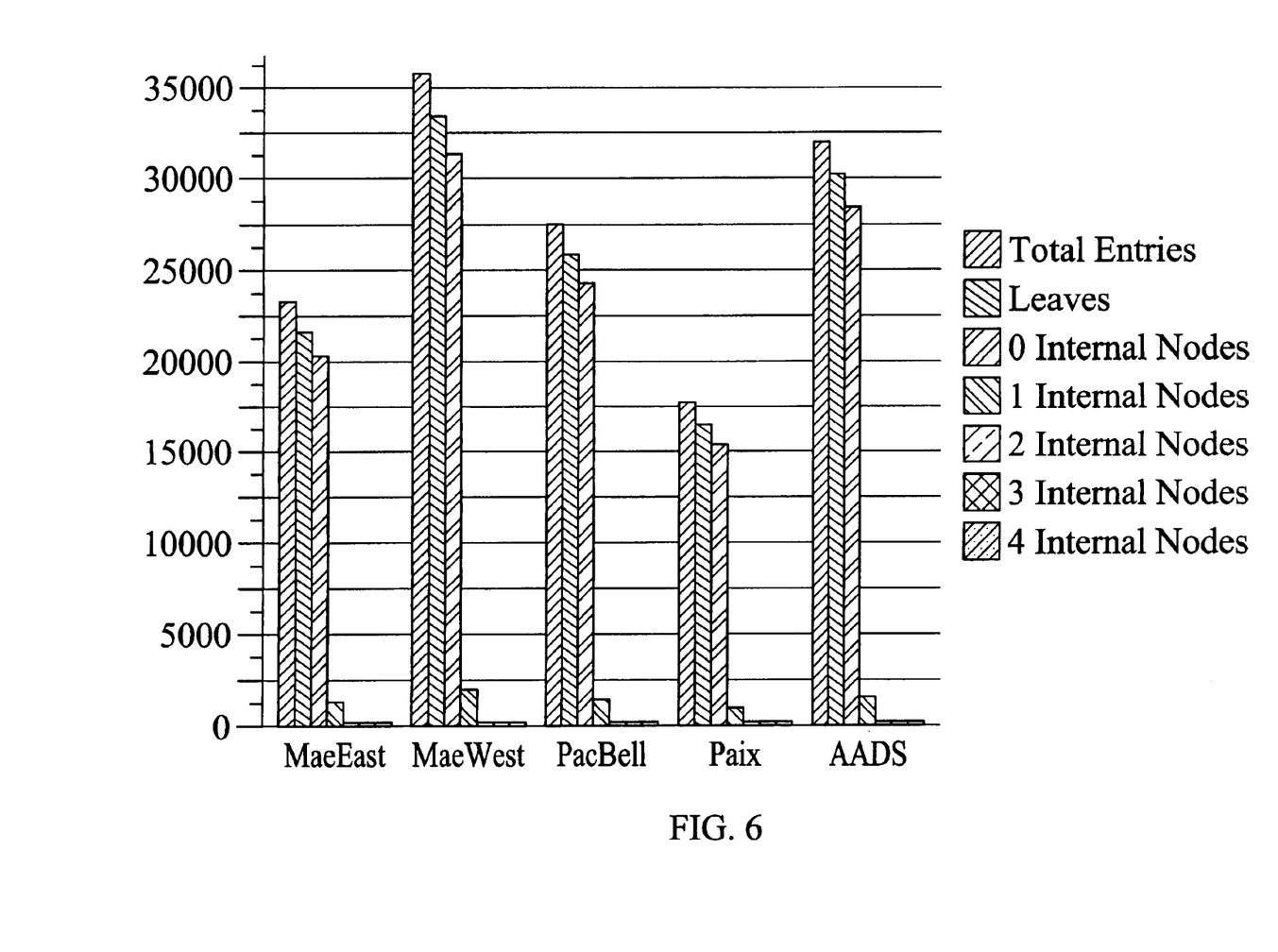
FIG. 6 is a histogram illustrating routing data at various points in the Internet.

From Table 3 and Table 4 it may appear that a considerable amount of memory could be wasted in storing internal nodes multiple times. For instance, next hop addresses corresponding to nodes 1011* and 10* are stored in the list of next hops for both 101101* and 10111*. However, this may not occur often in actual routing tables. An examination of practical routing tables from "Michigan University and Merit Network. Internet Performance Management and Analysis (IPMA) Project." (http://nic.merit.edu/ipma), shows that most of the nodes in fact do not have any internal nodes and next hop lists to store. FIG. 6 shows the number of internal nodes for all the leaf nodes for various routing tables in the Internet. From FIG. 6, it can be seen that more than 93% of the leaf nodes do not have any internal nodes in the path to the root node. Therefore, the overhead in memory to store internal nodes multiple number of times is actually quite small.

In order to implement a leaf-node-only forwarding engine, the build and search algorithms described above need to be modified slightly to accommodate the changes. The main differences are that in the build phase, only the leaf nodes are added in the search space while the internal nodes only affect the path information field of the leaf nodes. In the search algorithm, the address needs to be matched against both the upper and lower entries to determine the better match. During updates, if the entry turns out to be an internal node, only the next hop lists and the parent information fields of the corresponding leaf nodes get updated.

Experimental Results

The algorithms described herein were tested on a SUN Ultra 5 with a 333 MHz processor and 512 MB of RAM. The programs were written in C and compiled with gcc with the compiler optimization level 3. The results were compared against the LSV scheme described in Lampson et al. (B. Lampson, V. Srinivasan, and G. Varghese, "IP Lookups using Multiway and Multicolumn Search," *Proc. IEEE INFOCOM '98*, vol. 3, (San Francisco, Calif.), pp. 1248–1256, 1998). The binary search portions of all algorithms were identical. Search time, build time and memory consumption were used to evaluate the performance of the schemes. Practical routing tables from "Michigan University and Merit Network. Internet Performance Management and Analysis (IPMA) Project." (http://nic.merit.edu/ipma), were used in the experiments.

Average Search Time

Random IP addresses were generated and a lookup was performed using both schemes. Table 5 lists the average lookup times for different routing tables.

TABLE 5

Average Search Times for Different Routing Tables

| Routing Table | No. of Entries | Binary Search (All nodes) | Binary Search (Only Leaves) | LSV Scheme |
|---|---|---|---|---|
| MaeEast | 23113 | 662 ns | 610 ns | 761 ns |
| MaeWest | 35752 | 742 ns | 652 ns | 845 ns |
| PacBell | 27491 | 703 ns | 656 ns | 761 ns |
| Paix | 17641 | 640 ns | 634 ns | 739 ns |
| AADS | 31958 | 700 ns | 640 ns | 777 ns |

From Table 5 it can be seen that the scheme that uses all nodes in the search space results in over 10% improvement in lookup speeds over the LSV scheme. With internal nodes eliminated from the search space, an improvement of 15–20% can be obtained.

The time taken to search for an entry in the LSV scheme is of the order of log(2N), where N is the number of entries in the routing table. Once the binary search is performed, an additional memory lookup is required (approximately half the time of the original lookup) to obtain the next hop address. In comparison, the search space in the present schemes is ≦N. Therefore, the present schemes result in 1–2 fewer memory accesses in the binary search than conventional binary search schemes. After the search space is narrowed to the leaf-node-only structures, the present schemes may not require any additional memory lookups to determine the next hop address. For these reasons, the average lookup time in the present schemes is lower than the lookup time in the LSV scheme.

Data Structure Build Time

Times required to build the searchable structure from the routing tables are shown in Table 6. Each entry in Table 6 corresponds to a particular Internet routing table.

TABLE 6

Routing Table Build Times

| Routing Table | No. of Entries | Binary Search (All nodes) | Binary Search (Only Leaves) | LSV Scheme |
|---|---|---|---|---|
| MaeEast | 23113 | 80 ms | 80 ms | 210 ms |
| MaeWest | 35752 | 130 ms | 120 ms | 330 ms |
| PacBell | 27491 | 90 ms | 90 ms | 260 ms |
| Paix | 17641 | 60 ms | 50 ms | 150 ms |
| AADS | 31958 | 120 ms | 100 ms | 300 ms |

The time shown in Table 6 does not include the initial time taken to read entries from a file and store them in an array. This means that for all algorithms tested, time starts from sorting the entries and ends when the searchable structure is built. As seen from Table 6, the time taken to build the searchable space using LSV scheme is more than two times the time taken to build ours. A profile of the times taken using gprof, shows that most of the difference can be accounted for by the initial sorting of entries. Since the number of entries in the LSV scheme is more than twice that of the present invention, sorting becomes a fairly expensive operation.

Build time for the scheme that uses only leaves in its searchable space is not significantly different from the implementation that uses all the nodes. This is due to the fact that most of the entries in these routing tables end up as leaves, and the overhead in adding internal nodes is very small. The build time will be particularly crucial for larger routing tables because updating entries requires the entire searchable space to be built from scratch in the LSV scheme. For large routing tables (>100,000 entries), this could be serious problem in their scheme.

Memory Consumption

Table 7 shows the memory required in storing the searchable structure for the present schemes and the LSV scheme for various Internet routing tables.

TABLE 7

Routing Table Memory Consumption

| Routing Table | No. of Entries | Binary Search (All nodes) | Binary Search (Only Leaves) | LSV Scheme |
|---|---|---|---|---|
| MaeEast | 23113 | 0.62 MB | 0.58 MB | 1.06 MB |
| MaeWest | 35752 | 0.96 MB | 0.9 MB | 1.64 MB |
| PacBell | 27491 | 0.74 MB | 0.7 MB | 1.26 MB |
| Paix | 17641 | 0.48 MB | 0.45 MB | 0.81 MB |
| AADS | 31958 | 0.86 MB | 0.81 MB | 1.46 MB |

As illustrated in Table 7, memory required for both of the present binary schemes is close to half of that required for the LSV scheme. This is because each prefix in the LSV algorithm gives rise to two entries in the binary search table and the present schemes require at most a single entry for each prefix. Memory requirements for the present scheme that uses only leaves in its searchable space is not significantly different from the schemes using all the nodes, for the reasons stated above.

One potential problem with the present schemes is that the path information field has to be equal to the size of the address in order to indicate which bits in the current prefix correspond to parent node prefixes. For IPv4 this means that the path information field has to be 32 bits. For IPv6, this would mean storing a 128 bit field, leading to higher memory consumption and longer times to process instructions using this 128 bit field. In comparison, the additional information that LSV scheme uses are pointers, the size of which would depend on the number of entries. For a routing table with 100,000 entries, the pointers need to be only 18 bits wide. Storing the high and low pointers in their scheme, would make the extra memory consumption to 36 bits as compared to 128 bits when applying the present schemes to IPv6. However, this could be improved somewhat as follows. If very long or very short prefixes do not exist in the routing tables, then the number of bits used in storing the path information can be reduced. For instance, for the MaeEast routing table, no prefixes exist for prefix lengths smaller than 8 bits and larger than 30 bits. The path information field, therefore, only needs to have 23 bits to store the relevant information. Data on the appearance of core routing tables for IPv6 is not readily available. However, the number of bits used in storing the path information should be able to be reduced.

Conclusions

The present invention includes methods and systems that adapt a binary search to work with variable length prefixes by storing information corresponding to parent nodes in routing table entries. The time taken to search for a next hop address is reduced because the number of accesses to the routing table is reduced. Further improvement in performance can be obtained by using only mutually disjoint prefixes in the searchable space. The present schemes achieve a 10–20% improvement in average lookup time over the LSV scheme. In addition, by reducing the search space by a factor of one half using mutually disjoint prefixes, the amount of memory taken by the searchable space is also reduced by a factor of about one half. The time required to build the searchable structure is also reduced by using mutually disjoint prefixes due to the fewer number of entries.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for constructing a network address forwarding table, the method comprising:
   (a) storing a plurality of variable-length network address prefixes in a predetermined order in a network address forwarding table, each prefix corresponding to an entry in the network address forwarding table, the entries in the network address forwarding table corresponding to nodes in a binary tree;
   (b) storing, in each entry, path information in addition to the prefix the path information identifying bits of the prefix, for the entry corresponding to parent nodes of the entry; and
   (c) storing, in each entry, packet forwarding information corresponding to each parent node of the entry.

2. The method of claim 1 wherein storing a plurality of variable-length network address prefixes in a predetermined order in a network address forwarding table includes storing a plurality of IP addresses in an IP address forwarding table.

3. The method of claim 1 wherein storing a plurality of variable-length network address prefixes in a predetermined order includes arranging the network address prefixes in ascending order.

4. The method of claim 1 wherein storing a plurality of variable-length network address prefixes in a predetermined order in a network address forwarding table includes arranging the network address prefixes in descending order.

5. The method of claim 1 wherein storing a plurality of variable-length prefixes in a network address forwarding table includes storing prefixes corresponding to internal nodes and leaf nodes in the binary tree.

6. The method of claim 1 wherein storing packet forwarding information in each entry includes storing next hop IP address information in each entry.

7. The method of claim 1 wherein storing packet forwarding information in each entry includes storing output port information in each entry.

8. The method of claim 1 wherein storing packet forwarding information in each entry includes storing a pointer to a list of next hop addresses in each entry.

9. The method of claim 1 further comprising storing, in each entry, a value indicating the number of parent nodes of each entry.

10. A memory having a data structure stored therein, the data structure being constructed according to the steps in claim 1.

11. A method for constructing a network address forwarding table, the method comprising:
   (a) storing a plurality of variable-length network address prefixes in a predetermined order in a network address forwarding table, each prefix corresponding to an entry in the network address forwarding table, the entries in the network address forwarding table corresponding to nodes in a binary tree;
   (b) storing, in each entry, path information identifying bits of the prefix for the entry corresponding to parent nodes of the entry; and (c) storing, in each entry, packet forwarding information corresponding to each parent node of the entry, wherein the entries in the network address forwarding table correspond only to leaf nodes in the binary tree.

12. The method of claim 11 comprising storing internal node prefix information in the path information for each leaf node.

13. A method for constructing a network address forwarding table, the method comprising:
   (a) storing a plurality of variable-length network address prefixes in a predetermined order in a network address forwarding table, each prefix corresponding to an entry in the network address forwarding table, the entries in the network address forwarding table corresponding to nodes in a binary tree;
   (b) storing, in each entry, path information identifying bits of the prefix for the entry corresponding to parent nodes of the entry; and
   (c) storing, in each entry, packet forwarding information corresponding to each parent node of the entry, wherein storing path information in each entry includes a storing a binary bit string including a plurality of ones and zeros in each entry, the position of each one in the binary bit string indicating bits of the prefix in the entry that corresponds to a parent node prefix.

14. A method for locating forwarding information for a received packet, the method comprising performing binary network address lookup in a network address forwarding table including entries having variable-length network address prefixes, the entries corresponding to nodes in a binary tree, wherein performing a binary network address lookup includes:
   (a) comparing a destination network address extracted from a received packet to the prefixes in the network address forwarding table;
   (b) locating first and second prefixes in first and second entries in the network address forwarding table between which the destination network address falls;
   (c) extracting path information from the second entry in the network address forwarding table, the path information being separate from the second prefix and indicating bits of the second prefix corresponding parent nodes of the second prefix in the binary tree;
   (d) determining a longest prefix that matches the destination network address using the path information; and
   (e) extracting, from the second entry, packet forwarding information corresponding to the longest matching prefix.

15. The method of claim 14 wherein performing a binary network address lookup in a network address table includes performing an IP address lookup and an IP forwarding table.

16. The method of claim 14 wherein comparing the destination network address to prefixes in the table includes comparing the value of the destination network address to the value of the prefixes in the table to determine whether the destination network address is less than or greater than the prefixes In the table.

17. The method of claim 14 wherein the first entry is the closest entry in the table that is less than the destination network address and the second entry is the entry in the table closest in value to the destination network address that is greater than the destination network address.

18. The method of claim 14 wherein extracting packet forwarding information includes extracting a packet forwarding address corresponding to the longest matching prefix.

19. The method of claim 14 wherein extracting packet forwarding information includes extracting an output port identifier corresponding to the longest matching prefix.

20. A method for locating forwarding information for a received packet, the method comprising performing binary network address lookup in a network address forwarding table including entries having variable-length network address prefixes, the entries corresponding to nodes in a binary tree, wherein performing a binary network address lookup includes:
   (a) comparing a destination network address extracted from a received packet to the prefixes in the network address forwarding table:
   (b) locating first and second prefixes in first and second entries in the network address forwarding table between which the destination network address falls;
   (c) extracting path information from the second entries in the network address forwarding table, the path information indicating bits of the second prefix corresponding parent nodes of the second prefix in the binary tree;
   (d) determining a longest prefix that matches the destination network address using the path information; and
   (e) extracting, from the second entry, packet forwarding information corresponding to the longest matching prefix, wherein extracting path information includes extracting a binary bit string from the second entry, the binary bit string including a plurality of ones and zeros, the position of each one in the binary bit string corresponding to bits of the second prefix that identify the parent nodes of the second prefix.

21. A memory for storing data for access by a network address forwarding engine, the memory comprising a data structure stored in the memory, the data structure including information resident in a forwarding address table for use by the network address forwarding engine and including:
   (a) a plurality of entries arranged in a predetermined order, each entry including a variable-length network address prefix to be compared to destination network addresses in received packets, the entries corresponding to nodes in a binary tree;
   (b) each entry further including path information in addition to the prefix, the path information indicating parent nodes of each prefix in the binary tree; and
   (c) each entry further including packet forwarding information for each parent node indexed by the path information.

22. The memory of claim 21 wherein the plurality of entries correspond to internal nodes and leaf nodes in the binary tree.

23. The memory of claim 21 wherein the plurality of entries correspond only to leaf nodes in the binary tree.

24. The memory of claim 21 wherein the variable-length network address prefixes include bit values to be compared to destination IP addresses in received IP packets.

25. The memory of claim 21 wherein the entries are arranged in ascending order.

26. The memory of claim 21 wherein the entries are arranged in descending order.

27. The memory of claim 21 wherein the packet forwarding information includes next hop address information for each parent node.

28. The memory of claim 21 wherein the packet forwarding information includes output port identifier information for each parent node.

29. A memory for storing data for access by a network address forwarding engine, the memory comprising a data structure stored in the memory, the data structure including information resident in a forwarding address table for use by the network address forwarding engine and including:

(a) plurality of entries arranged in a predetermined order, each entry including a variable-length network address prefix to be compared to destination network addresses in received packets, the entries corresponding to nodes in a binary tree;

(b) each entry further including path information indicating parent nodes of each prefix in the binary tree; and (c) each entry further including packet forwarding information for each parent node indexed by the path information, wherein the plurality of entries correspond only to leaf nodes in the binary tree and, wherein the path information for each leaf node includes bits indicating internal nodes that are parent nodes of each leaf nodes.

30. A memory for storing data for access by a network address forwarding engine, the memory comprising a data structure stored in the memory, the data structure including information resident in a forwarding address table for use by the network address forwarding engine and including:

(a) plurality of entries arranged in a predetermined order, each entry including a variable-length network address prefix to be compared to destination network addresses in received packets, the entries corresponding to nodes in a binary tree;

(b) each entry further including path information indicating parent nodes of each prefix in the binary tree; and (c) each entry further including packet forwarding information for each parent node indexed by the path information, wherein the path information in each entry includes a series of ones and zeros, each one in the path information indicating bits in the prefix that correspond to the parent nodes of the prefix.

31. A packet forwarding device comprising:

(a) a packet forwarding table embodied in a computer-readable medium, the packet forwarding table including a plurality of variable-length network address prefixes arranged in a predetermined order, each prefix corresponding to an entry in the packet forwarding table, the entries corresponding to nodes in a binary tree and packet forwarding information corresponding to each parent node of the entry, and each entry storing path information indicating parent nodes of each entry in the binary tree; and (b) a packet forwarding engine for performing a binary search of the packet forwarding table using a destination address in a received packet and locating a longest-matching prefix corresponding to the destination address using the path information in the forwarding table.

32. The device of claim 31 wherein the packet forwarding table comprises an IP packet forwarding table.

33. The device of claim 31 wherein the packet forwarding table includes entries for leaf nodes and internal nodes in the binary tree.

34. The device of claim 31 wherein the packet forwarding table only includes entries for leaf nodes in the binary tree.

35. The device of claim 31 wherein the path information in each entry indicates bits of each entry that correspond to parent nodes of each entry.

36. The device of claim 31 wherein each entry stores packet forwarding information for each parent node indicated by the path information.

37. The device of claim 36 wherein the packet forwarding information includes next hop address information.

38. The device of claim 36 wherein the packet forwarding information includes output port identifier information.

39. The device of claim 31 wherein the packet forwarding engine is adapted to locate packet forwarding information corresponding to the longest-matching prefix.

40. A packet forwarding device comprising:

(a) a packet forwarding table embodied in a computer-readable medium, the packet forwarding table including a plurality of variable-length network address prefixes arranged in a predetermined order, each prefix corresponding to an entry in the packet forwarding table, the entries corresponding to nodes in a binary tree, and each entry storing path information indicating parent nodes of each entry in the binary tree; and (b) a packet forwarding engine for performing a binary search of the packet forwarding table using a destination address in a received packet and locating a longest-matching prefix corresponding to the destination address using the path information in the forwarding table, wherein the packet forwarding table only includes entries for leaf nodes in the binary tree, and wherein the path information for each leaf node entry indicates prefixes of internal nodes that are parent nodes of each leaf node.

* * * * *